United States Patent [19]

Feurgard et al.

[11] Patent Number: 4,545,562

[45] Date of Patent: Oct. 8, 1985

[54] DEVICE FOR ELIMINATION OF VIBRATIONS OF A VALVE FOR DECOMPRESSION OF AN ENCLOSURE

[75] Inventors: René Feurgard, La Celle St-Cloud; Jacques Baujat, Versailles, both of France

[73] Assignee: Framatome & Cie, Courbevoie, France

[21] Appl. No.: 508,706

[22] Filed: Jun. 28, 1983

[30] Foreign Application Priority Data

Jul. 1, 1982 [FR] France .................................. 82 1157

[51] Int. Cl.[4] ............................................. F16K 31/02
[52] U.S. Cl. .................................. 251/129.20; 251/65; 74/559; 137/514
[58] Field of Search ........................ 251/138.64, 77, 78, 251/231, 236, 242, 244–246; 137/467, 514; 188/130; 267/64.11; 74/559

[56] References Cited

U.S. PATENT DOCUMENTS

| | | | |
|---|---|---|---|
| 1,406,799 | 2/1922 | Wood | 137/514 |
| 2,354,428 | 7/1944 | Saurer | 188/130 |
| 2,504,006 | 4/1950 | Davis | 137/514 |
| 2,910,079 | 10/1959 | Beeghly | 136/467 |
| 2,993,506 | 7/1961 | Hillman | 251/64 |
| 4,286,621 | 9/1981 | Glahn | 137/514 |

FOREIGN PATENT DOCUMENTS 212090  3/1924  United Kingdom ............... 188/130

Primary Examiner—Samuel Scott
Assistant Examiner—Noah Kamen
Attorney, Agent, or Firm—Pollock, Vande Sande & Priddy

[57] ABSTRACT

Device for elimination of vibrations of a valve for decompression of an enclosure containing a fluid under pressure, comprising a lever articulated on the valve body in two parts. The first part is integrally fixed to a spindle mounted to rotate in the valve body. This part comprises a rocker arm and its end opposite the rocker arm is connected to the valve stem. The second part is connected to the moveable armature of an electromagnet and comprises a bearing surface for the tappet. The two parts of the lever are connected through the intermediary of a friction coupling. Movements of the valve beyond the position of locking by the electromagnet are damped by the friction coupling. The invention is applicable in particular to a decompression valve in a pressurized water nuclear reactor.

5 Claims, 3 Drawing Figures

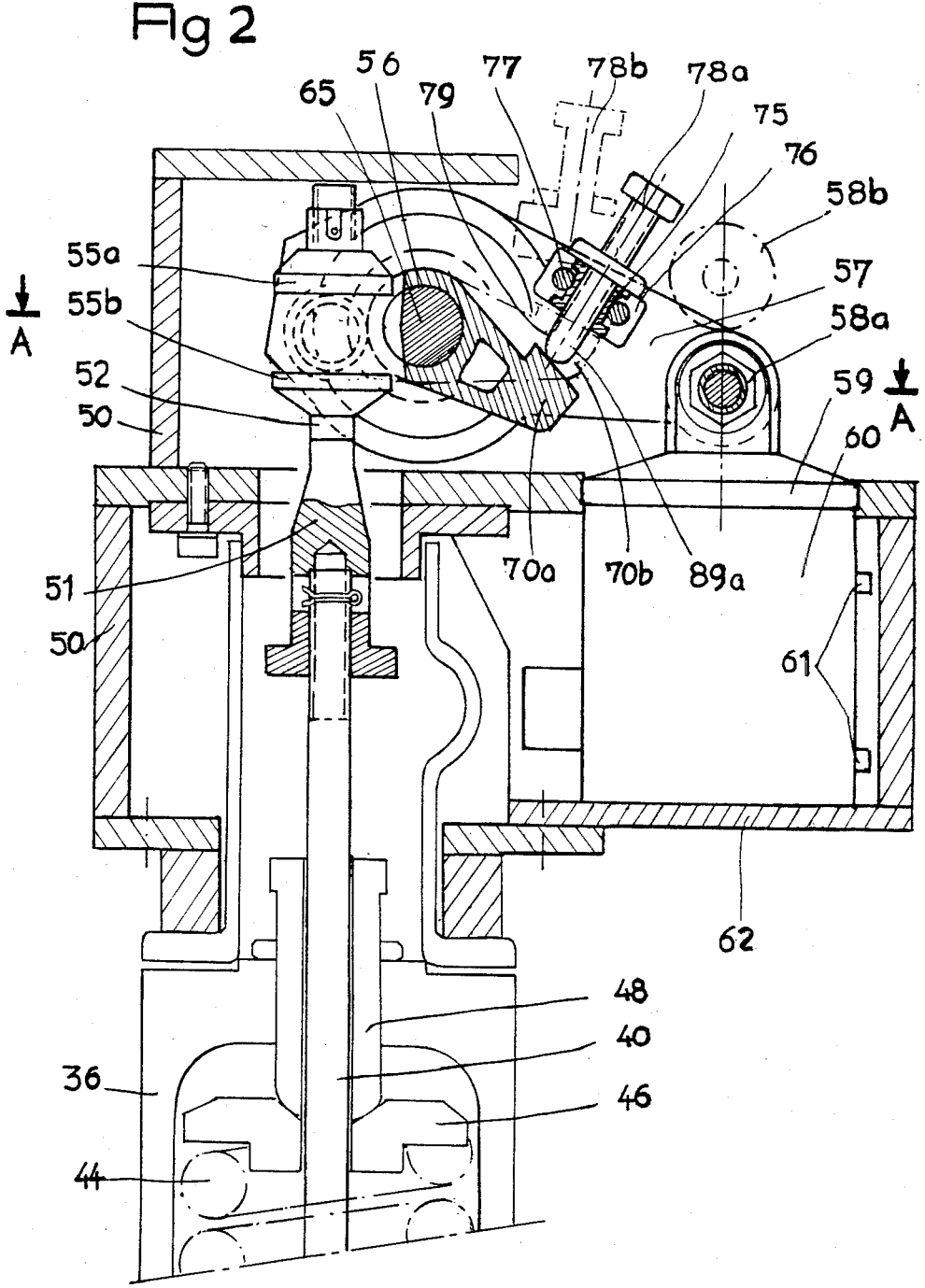

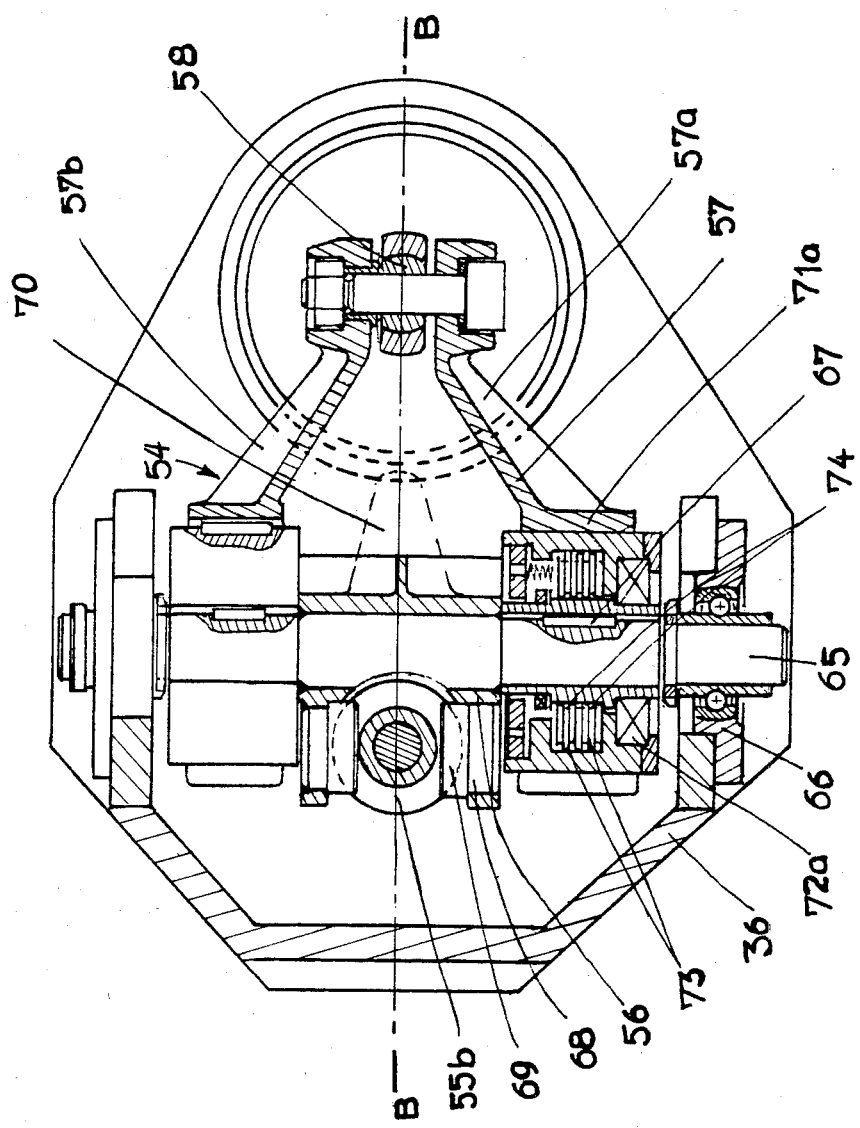

DEVICE FOR ELIMINATION OF VIBRATIONS OF A VALVE FOR DECOMPRESSION OF AN ENCLOSURE

FIELD OF THE INVENTION

The invention relates to a device for elimination of vibrations of a valve for decompression of an enclosure containing a fluid under pressure.

BACKGROUND OF THE INVENTION

Within the framework of the development of nuclear power stations, it is necessary to employ safety valves which enable decompression of enclosures containing a fluid under pressure, in the event of the pressure of the fluid becoming higher than a limiting value fixed at the time of the design of the components of the power station.

This enclosure may contain a fluid in circulation and form a circuit such as the primary circuit of the reactor containing water under high pressure and at very high temperature, or it may form an enclosure containing a fluid under static pressure, whether this fluid be a liquid such as water under pressure or a gas such as steam.

In any case, these circuits or enclosures must be equipped with safety valves for the case where the pressure comes to exceed the permitted limits defined at the time of the design of the circuit or enclosure, taking into account a factor of safety.

These valves are intended for decompressing the circuit or enclosure very rapidly in the event of excess pressure.

Such valves consist of a hollow body mounted on the enclosure and communicating with an opening in it. Inside this hollow body a stem is mounted for movement, for the displacement of a valve gate attached to one end of it, between a position of closure in which the valve gate rests against a seat surrounding the opening in the enclosure and an open position in which the valve gate is removed from its seat. A calibrated spring bearing against the valve body on the one hand and against the valve stem on the other, enables a force to be exerted for returning the valve gate onto its seat, so that the valve gate remains in the closed position as long as the pressure in the circuit or enclosure does not exceed the nominal value.

At the time of lifting of the valve gate, a portion of the fluid under pressure is ejected outside the enclosure, which enables a pressure to be re-established which is less than the nominal value, the calibrated spring then enabling the valve gate to be brought back into the position of closure against its seat.

However, in the case of a gaseous or liquid fluid such as steam or superheated water or cold water, pressure waves are created upstream of the valve at the time of its opening, which may bring about unstable operation of this valve, i.e., high-frequency pulsations.

This working condition of unstable operation brings about serious disadvantages such as seizing of the valve or hammering in the steam pipework. This is so in particular when the valve is connected to a volume under pressure by pipework of a certain length.

When the valve must permit the escape of a non-compressible fluid, such as the water in the primary circuit of a pressurized-water nuclear reactor, towards a reservoir provided for this purpose, the fluid is set in motion instantaneously just upstream of the valve, whereas it remains stationary through inertia in the pipework at a certain distance from this valve. This causes a very sharp depression which has a tendency to reclose the valve immediately after its opening.

Further, in the case where the fluid is non-compressible, there is no expansion of it to enable the valve gate to be held in the open position above its seat. Hence there is a serious risk of unstable operation, pulsation of the valve and untimely closure.

A device for elimination of vibrations of a valve for decompression of an enclosure containing a fluid under pressure, at the time of its actuation under the effect of the pressure of the fluid, has therefore been proposed in French Pat. No. 81 20391. In this device, the valve comprises, in a hollow body mounted on the enclosure and communicating with an opening of the latter, a valve closure gate complemented by a seat encircling the opening, a stem integrally fixed to the gate, moveable in the body of the valve, for the opening and the closing of the gate, a spring bearing on the stem by one of its ends and on the valve body by its other end, to maintain the gate on its seat, as long as the pressure within the enclosure remains lower than a limiting pressure. The device for elimination of vibrations comprises an electromagnet arranged outside the valve body, having a fixed part comprising an exciting winding, and a moveable armature connected to the end of the valve stem opposite that carrying the gate. This armature is moveable between two stable positions corresponding respectively to the total or partial opening and to the closing of the gate. The stability of at least one of these positions is obtained by the magnetic force exerted by the winding on the moveable armature when the winding is energized. The device for elimination of vibrations also comprises a means of control of the energizing of the electromagnet, as a function of the value of the pressure in the enclosure relative to at least one reference pressure.

At the beginning of the raising movement of the valve stem, under the effect of a pressure within the enclosure greater than the reference pressure, the electromagnet being energized with electric current, the moveable armature clings to the end of the exciting winding, which prevents the valve stem and the gate from falling on the valve seat, even if the pressure falls within the enclosure or undergoes oscillations in the region of the valve seat.

Preferably, the valve stem is connected to the moveable armature through the intermediary of a lever which is articulated to the valve body comprising a part arranged within this valve body and a part arranged outside.

The part arranged within the valve body is connected to the stem while the end of the part arranged outside the valve body is connected to the moveable armature.

Such levers exist generally on the safety valves to which the device according to the French patent is applicable.

When the clinging of the moveable armature is produced, at the beginning of the rising movement of the safety valve, the movement of the valve stem can nevertheless continue, in the opening direction, to increase the section of the outflow of the fluid under pressure.

The connection between the valve stem and the lever must therefore allow a certain relative movement of these two components.

For example, a spring which deforms by compression during the relative movement may be interposed between the two components.

Such a device does not, however, permit the damping of the possible vibrations of the gate and of the valve stem during the open movement following the magnetic clinging of the moveable armature. Such vibrations can occur in the event of pressure fluctuations in the enclosure or in the region of the outlet opening of the latter. Their effects are however greatly attenuated since the gate cannot fall back to the closed position on its seat, the fall of the stem being prevented by the moveable armature and the lever being held in position by magnetic force.

It remains desirable nevertheless to avoid the vibrations equally during the opening movement of the valve following the magnetic clinging of the moveable armature.

SUMMARY OF THE INVENTION

The aim of the invention is accordingly to propose a device for elimination of vibrations of a valve for decompression of an enclosure containing a fluid under pressure at the time of its activation under the effect of the pressure of the fluid, the valve comprising, inside a valve body mounted on the enclosure and communicating with an opening of the latter, a valve closure gate complemented by a seat encircling the opening, an essentially vertical stem integrally fixed to the valve gate connected at its end opposite the valve gate to a lever mounted on a spindle on the valve body and moveable in the valve body, for the opening and the closing of the valve gate, a spring bearing on the stem by one of its ends and on the valve body by its other end, for holding the valve gate on its seat while the pressure inside the enclosure remains below a limiting pressure, the device for elimination of vibrations comprising at least one electromagnet whose moveable armature is connected to the lever outside the valve body and a means for supplying the electromagnet permitting a magnetic force to be exerted on the moveable armature and the valve stem, a device which makes it possible to damp the possible vibrations of the valve gate and of the valve stem, during movements of the latter past the position of magnetic locking.

To this end, the lever comprises two parts:

a first part connected in an articulated manner to the end of the valve stem opposite the end carrying the valve gate, integrally fixed to a horizontal spindle mounted to rotate in the valve body constituting the axis of the lever and comprising an extension, or rocker arm, this rocker arm and the articulated coupling of the valve stem being arranged on either side of the lever axis, and a second part connected in an articulated manner to the moveable armature and connected to the first part through the intermediary of a friction coupling having for its axis of rotation the axis of the lever, one of the coupling components of which is fixed to the first part of the lever and the other coupling component of which is integrally fixed to the second part of the lever, this second part comprising in addition a bearing surface located opposite and above the rocker arm of the first part of the lever, to integrate the two parts of the lever in rotation, at the end of the falling movement of the valve stem.

In order that the invention may be more clearly understood, a description will now be given, by way of example, with reference to the appended drawings, of an embodiment of a device for elimination of vibrations according to the invention, in the case of a valve for decompression of a pressurizer situated in the primary circuit of a pressurized water nuclear reactor.

BRIEF DESCRIPTION OF THE DRAWINGS

FIG. 2 is a view in cross-section in a vertical plane, along line B—B of FIG. 3, of a damping device according to the invention.

FIG. 3 is a view in cross-section in a horizontal plane A—A of FIG. 2.

DETAILED DESCRIPTION

Figure 1:
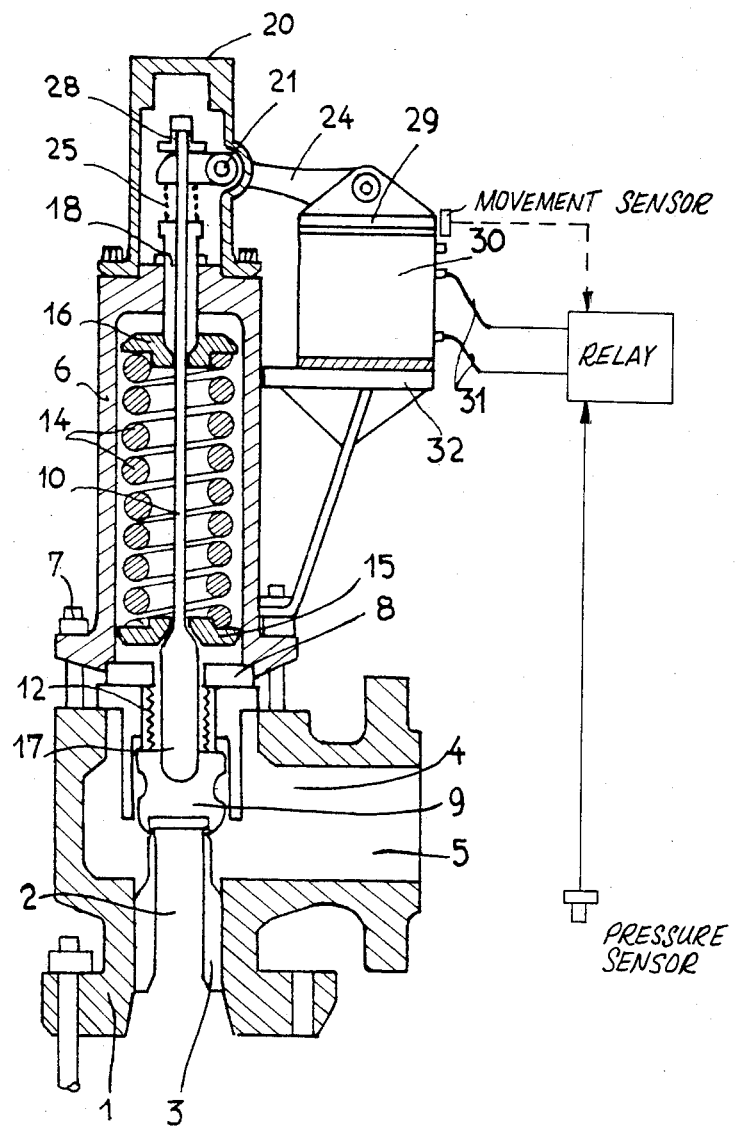
FIG. 1 is a view in cross-section in a vertical plane of a device according to French Pat. No. 81 20391.

FIG. 1 shows a portion 1 of the wall of an enclosure or of a circuit enclosing a fluid under pressure, this wall 1 having an opening 2 inside which is fixed a seat 3 the upper end of which is at the level of a chamber 4 opening into a discharge channel 5, for the ejection of fluid in the event of decompression. Above the chamber 4 is mounted, in communication with the opening 2, a valve body 6 by means of screws and nuts 7 and a seal 8.

In FIG. 1, the valve is shown in closed position, a valve gate 9 coming to rest on the seat 3, for the closure of the channel 2.

The gate 9 is integrally fixed to a stem 10 mounted along the vertical axis of the valve body and moveable by vertical displacement for the opening or the closing of the gate.

The upper part of the chamber formed by the valve body is isolated from the discharge chamber 4 by a bellows 12 which is connected firstly to the gate and secondly to the seal 8.

A spring 14 arranged inside the valve body is located between two bearing elements 15 and 16, the element 16 bearing on the valve body 6 and the element 15 bearing on a widened portion 17 of the stem 10.

The spring is calibrated so that the force it exerts on the stem 10 and the gate 9 retains the valve in closed condition so long as the pressure inside the enclosure 1 does not exceed a predetermined limit value.

In the event of this value being exceeded, the force exerted by the fluid under pressure on the gate 9 forces the latter upwardly, for the discharge of the fluid into the chamber 4 and the duct 5 communicating with the outside.

Above the spring 14, the stem 10 is slidably received in a bearing element 18 which also ensures its vertical guidance inside the valve body.

The upper part of the valve body consists of a casing 20 carrying a spindle 21 on which is pivotably mounted a lever 24 passing through the wall of the casing 20 and arranged for possible manual actuation of the valve.

The end of the lever 24 arranged inside the casing 20 has an opening within which the upper end of the valve stem 10 can move freely.

Between the bearing and guidance element 18 and the lower end of the lever 24 is situated a spring 25 serving for the transmission of forces between the valve stem 10 and the lever 24.

Above the lever 24, the upper end of the stem 10 is threaded and a nut 28 enables abutment of the stem 10 relative to the lever 24.

At the outer end of the lever 24 is rotatably fixed the moveable armature 29 of an electromagnet 30 the fixed portion of which comprises a winding fed by the wires 31 and rests on a support 32 fixed to the valve body 6.

The power supply to the winding is effected through the intermediary of a relay, which is itself controlled by a pressure sensor arranged inside the enclosure and enabling the supply to the coil 30 to be effected when the pressure in the enclosure exceeds the limiting value for which the gate 9 lifts from its seat 3. The upward movement of the stem 10 is then transmitted through the intermediary of the spring 25 to the lever 24 which displaces downwards the moveable armature 29 which comes to cling to the fixed part of the electromagnet, which is then energized by virtue of the circuit comprising the wires 31.

The lifting of the gate and of the stem 10 continues, while the discharge of the fluid under pressure is effected through the chamber 4 and the duct 5.

If pressure oscillations during the discharge of the fluid under pressure reduce the forces lifting the gate 9, the stem 10 can drop again under the effect of the spring 14, but the nut 28 comes to a stop against the lever 24 which is held in position by the electromagnet 30.

This prevents the closure of the valve, although vibrations can still result from fluctuation of pressure in the enclosure during the discharge of the fluid.

When the pressure has fallen back to a predetermined level, by discharge of the fluid under pressure towards the outside, the supply of the winding is cut off automatically by a command of the relay, with the result that the lever 24 is unlocked and that the valve stem 10 and the gate 9 can fall back into their closed position under the effect of the actuating spring 14.

FIG. 2 shows the upper part of a decompression valve of the type illustrated in FIG. 1, modified in accordance with the invention.

This valve comprises a valve body 36 along the vertical axis of which is arranged the valve stem 40 fitted to slide inside a guidance element 48 fixed to the valve body 36. A helical spring 44 is also arranged inside the valve body 36, with its lower part (not shown) bearing on the gate which is fixed to the lower part of the valve stem 40. Its upper part is in contact with a bearing element 46 which abuts against the lower part of the guiding element 48.

In this way, the spring 44 exerts a downward return force on the valve and the stem 40 when the valve is lifted by the pressure prevailing in the enclosure.

The valve body 36 is extended at its upper part by a double casing 50 penetrated axially by the stem 40 and by an end element 51 which extends the latter in its upper part.

The end element 51 comprises a threaded portion 52 onto which are screwed two end stops 55a and 55b. These end stops 55a and 55b retain the end of the Lever 54 consisting of two parts 56 and 57 which can be seen in FIGS. 2 and 3.

The second part of the lever 57 consists of two symmetrical parts 57a and 57b, as can be seen in FIG. 3.

The two parts 57a and 57b are pivotally connected by a pivot 58 to the moveable armature 59 of the electromagnet 60 which has an electromagnetic winding supported by a carrier 62 fixed to the valve body 36.

The winding of the electromagnetic 60 is supplied by means of conductors 61 connected to a supply circuit comprising a relay controlled by a pressure pickup located on the enclosure. In this way, the electromagnetic winding can be supplied with electric current as soon as the pressure in the enclosure on which the valve is arranged attains a predetermined limit valve.

As can be seen in FIGS. 2 and 3, the first part of the lever 56 is fixed to a spindle 65 which is horizontal and rotate on the valve body 26 by virtue of roller bearings 66. The first part of the lever 56 and the spindle 65 are non-rotatably connected by a key 67.

The fitting of the two ends of the shaft inside the valve body 36 and on the part 56 of the lever 54 is identical for these two ends. The cross-section in FIG. 3 shows the detail of assembly for only one of the ends, the whole being entirely symmetrical relative to the plane marked B—B in this figure.

The part 56 of the lever carries pivots 68 which are fitted to rotate in bearings 69 clamped between the two end stops 55a and 55b fixed on the end part of the stem 40. In this manner, the part 56 of the lever 54 is connected in an articulated manner to the upper end of the valve stem.

The part 56 further comprises an extension 70 forming an actuating rocker arm, as will be seen later, arranged so that on the one hand this rocker arm and on the other hand the articulated joint between the part 56 of the lever 54 and the valve stem are situated on either side of the spindle 65 integrally fixed to this part 56 of the lever 54.

In FIG. 2, the rocker arm 70 is shown in two different positions 70a and 70b corresponding to two positions 58a and 58b of the articulation of the moveable armature also shown in FIG. 2. It will in fact be seen that the rocker arm 70 permits the repositioning of the moveable armature 59 during the downward movement of the valve stem, i.e., in the closing direction of the valve.

The two halves 57a and 57b of the second part of the lever 54 form, at their end not connected to the pivot 58, two casings 71 fitted in rotation by virtue of the roller bearings 72 on the first part 56 of the lever 54.

The axis of rotation of the two parts of the lever one relative to one another coincides with the axis of the shaft 65.

Inside the casings 71 are fitted friction disks 73 between which are inserted opposing friction disks 74 which are fixed to the part 56 of the lever 54.

The assembly consisting of the casings 71, the friction disks 73 and the disks 74 constitutes a friction coupling operating as a torque limiter fitted between the two parts of the lever 54.

This friction coupling also has the axis of the shaft 65 as its axis.

As can be seen in FIG. 2, a sleeve 75 comprising a screw-threaded opening along its axis inclined relative to the vertical, is arranged between the two arms 57a and 57b of the part 57 of the lever 54. This sleeve is maintained in position by means of a fixing element 76 and screws 77 engaged in the arms 57a and 57b of the part 57 of the lever 54.

Inside the sleeve 75 a screw 78 is engaged so that its rounded lower part 79 forms a bearing surface coming into contact with the rocker arm 70 of the first part 56 of the lever 54.

The bearing surface 79 arranged above the rocker arm 70 makes its possible, when these two parts are placed in contact, to integrate the two parts of the lever in rotation during a downward movement of the stem 40 driving the first part 56 of the lever 54.

The operation of the device according to the invention for elimination of vibrations during the opening and the closing of the valve will now be described.

When the valve is closed, the valve stem is in its low position and the armature 59 in its high position (shown in dot-dash lines in FIG. 2 by the position of the pivot 58 at 58b).

If the pressure in the enclosure exceeds the chosen reference pressure, the pressure pickup allows the energizing of the electromagnetic coil 60, while the valve gate and the stem begin to rise.

The upward movement of the valve stem 40 drives the first part 56 of the lever 54 and the shaft 65 in rotation. This rotation induces a rotation in the same direction of the second part 57 of the lever 54 through the intermediary of the friction coupling, the interposed disks 53 and 54 of which are set in rotation.

This rotary movement of the second part 57 of the lever 54 causes a downward movement of the moveable armature 59 connected to this part 57 by the pivot 58.

When the movable armature 59 reaches a certain distance from the electromagnetic coil 60, the magnetic attraction causes this moveable armature to cling to the fixed coil 60.

For example, such clinging may be obtained as soon as the moveable armature reaches a distance of 4 mm from the upper face of the coil 60.

The second part 57 of the lever 54 is then immobilized in rotation by the magnetic force exerted by the coil 60.

The bearing surface which is integrally fixed to this part 57 and formed by the lower part 89a of the screw 78 is then in the position shown in FIG. 2. If the pressure falls in the enclosure, or if this pressure fluctuates in the region of the valve seat, the stem 40 and the valve cannot fall back into the low position under the effect of the spring, which has been compressed during the lifting of the stem, because the rocker arm 70 enters into abutment on the bearing surface 89a when the stem falls back.

There is hence, as in French Pat. No. 81 20391, a magnetic locking of the valve stem against falling movements.

If the pressure continues to rise, on the other hand, the valve stem continues to move upwards by a relative rotation of parts 56 and 57 of the lever 54, the second part 57 of the lever remaining stationary.

This upward movement of the valve stem is damped by the friction coupling, the disks 73 and 74 of which move in rotation relative to each other.

If pressure oscillations are produced in the enclosure or in the region of its discharge opening, the vibrations of the valve stem are damped by the torque limiter.

The upward movement of the stem can thus continue without vibration as far as an upper stop limiting its movement.

Throughout this upward movement of the stem 40, the spring 44 has been compressed and, when the pressure in the enclosure has returned to a value below the set pressure, this spring permits the valve stem and the gate to be driven downwards.

The damping due to the torque limiter takes place regardless of the direction of movement of the stem, whether this movement be upward or downward.

The valve stem 40 begins its descent driving the first part of the lever 54 and the rocker arm 70 in rotation. So long as the tappet has not encountered the screw 78, the friction coupling opposes its resistance to the spring 44 because the second part of the lever 57 remains stationary, held by the moveable armature 59. When the rocker arm 70 encounters the screw 78 on its bearing surface 89a, the torque limiter ceases to operate and the two parts of the lever 54 are driven integrally in rotation. At this time only the magnetic force of the moveable armature opposes the spring 44. To avoid the resisting action of the electromagnetic device continuing when the valve closure is approaching, the electric supply circuit is cut off by the action of the pressure pickup.

At this time, the spring 44 can return the valve gate to its seat without resistance of the electromagnetic device.

At the end of the fallback movement of the stem, the rocker arm 70 permits the return of the moveable armature into the high position (shown in dot-dash lines in FIG. 2 the position 58b of the pivot 58).

The device according to the invention makes it possible not only to avoid the falling back of the stem into the low position and of the gate on its seat (an objective which was already attained by the device described in French Pat. No. 81 20391), but also to damp the vibrations of the stem during all its movements following the clinging of the moveable armature by magnetic force.

The device also permits an adjustment of the locking position of the rocker arm on the bearing surface by displacement of the screw 78 inside the sleeve 75. This displacement of the screw also permits an adjustment of the high position of the moveable armature 59.

The winding of the electromagnet 60 can be energized continuously instead of being energized by a circuit comprising a relay controlled by a pressure pickup. It is possible to insert in this supply circuit a cut-out relay controlled by a pressure pickup or by a force or movement sensor associated with the moveable armature and inserted between the latter and the support of the electromagnet. In the latter case, the cut-off of the supply current to the electromagnet intervenes as soon as the force exerted by the valve stem return spring on the moveable armature through the intermediacy of the lever exceeds a certain threshold, or as soon as the movement of the moveable armature commences. In the absence of a current cut-out device or in the event that the latter did not function, the force of the valve return spring is sufficient to unstick the moveable armature from the electromagnet.

The two parts of the lever may be constructed in a different manner from that which has been described and the friction coupling may have a different structure from that which has been described.

The rocker arm bearing surface on the second part of the lever may be constructed in a different manner from that described, in which a screw made possible an accurate adjustment of the locking position of the valve stem.

Finally, the device according to the invention is applicable whereever use is made of safety valves for the decompression of an enclosure or of a circuit containing a fluid under static or dynamic pressure.

We claim:

1. In a valve for decompression of an enclosure containing a fluid under pressure and comprising a valve body mounted on the enclosure and communicating with an opening of the latter; a seat formed in said valve body and defining a passage between said opening and a discharge passage; a valve closure gate mounted for movement toward and away from said seat in said valve body; a stem fixed to said valve gate at one end thereof and guided in said valve body for movement toward and away from said valve seat along with said valve gate; spring means compressed between said valve body and said stem for exerting on said valve steam a force sufficient for maintaining the valve gate on said seat as long as the pressure inside said enclosure and acting on said valve gate remains below a predetermined limit value;

a device for elimination of vibrations of said valve comprising;
- (a) a lever having a first part connected with said valve body for pivotal movement about an axis transverse to the direction of movement of said stem, having a two-way abutting connection with said stem and having a second part connected with said valve body for pivotal movement about the same axis as said first part;
- (b) electromagnetic means having a movable armature connected to said second part and actuatable for retaining said second part in a predetermined position in which said valve gate is clear of said valve seat when energized;
- (c) a friction coupling for rotatable frictional connection between said first and second parts;
- (d) a rocker arm fast with said first part; and
- (e) a bearing surface provided on said second part along the path of said rocker arm upon relative pivotal movement of said first part and second part, engageable by said rocker arm for providing an abutting connection between said first part and second part upon return of said valve gate onto said valve seat.

2. Device according to claim 1, comprising means for supplying said electromagnetic means consisting of an electric supply circuit in which is inserted a supply cut-out relay controlled by a pressure pickup fixed on said enclosure and measuring the fluid pressure in the latter, whereby said relay closes at a first pressure in said enclosure and opens at a second pressure in said enclosure.

3. Device according to claim 1, comprising means for supplying said electromagnetic means consisting of an electric supply circuit in which is inserted a supply cut-out relay controlled by a force or movement sensor interposed between said movable armature and a support for said electromagnetic means.

4. Device according to claim 1, wherein said second part of said lever comprises two arms pivotally connected to said moveable armature and each forming at its other end a casing having first friction discs therein, opposing friction discs fixed to said first part of said lever being interposed between said first friction discs.

5. Device according to claim 4, wherein the bearing surface of said second part of said lever has an adjustable position and consists of the end of a screw engaged in an internal screw-thread of a sleeve located between the arms of said second part of said lever.

* * * * *